United States Patent [19]

Arai

[11] Patent Number: 4,506,272

[45] Date of Patent: Mar. 19, 1985

[54] THERMAL PRINTING HEAD

[75] Inventor: Shoji Arai, Kyoto, Japan

[73] Assignee: Matsushita Electric Industrial Co., Ltd., Osaka, Japan

[21] Appl. No.: 439,643

[22] Filed: Nov. 5, 1982

[30] Foreign Application Priority Data

Nov. 6, 1981 [JP] Japan .................................. 56-178845

[51] Int. Cl.$^3$ .............................................. G01D 15/10

[52] U.S. Cl. ................................ 346/76 PH; 400/120; 219/216

[58] Field of Search .................... 346/76 PH; 219/216; 400/120; 338/308

[56] References Cited

U.S. PATENT DOCUMENTS

| | | | |
|---|---|---|---|
| 2,645,701 | 7/1953 | Kerridge | 338/308 |
| 2,683,673 | 7/1954 | Silversher | 338/308 |
| 3,578,946 | 5/1971 | Colello | 346/76 PH |
| 4,141,018 | 2/1979 | Mizuguchi | 346/76 PH |
| 4,390,884 | 6/1983 | Applegate | 346/76 PH |
| 4,423,425 | 12/1983 | Reese | 346/76 PH |

OTHER PUBLICATIONS

Regehr, "Thermal Printer Assembly", Jan. 1980, pp. 3337–3341, *IBM Tech. Disc. Bulletin.*

*Primary Examiner*—E. A. Goldberg
*Assistant Examiner*—M. Reinhart
*Attorney, Agent, or Firm*—Burgess, Ryan & Wayne

[57] ABSTRACT

A very compact thermal printing head which may be manufactured at low cost is proposed. The thermal printing head integrally comprises a given multiple of heaters formed in an array, and a plurality of semiconductor devices each having at least a plurality of transistors which are respectively connected to heaters and a shift register which transfers an image signal for selectively switching the plurality of transistors. Straight lead wires are used to connect the semiconductor devices and the heaters, and L-shaped or inverted L-shaped lead wires are used to connect the semiconductor devices and a set of multi-layer wiring conductors having terminal mount portions of the head. These straight and L-shaped (or inverted L-shaped) lead wires are respectively supported on electrically insulating flexible films obtained by the TAB (tape automated bonding) method.

6 Claims, 10 Drawing Figures

THERMAL PRINTING HEAD

BACKGROUND OF THE INVENTION

I. Field of the Invention

The present invention relates to a thermal printing head and, more particularly, to a thermal printing head which is integrally constituted by a heater array and a plurality of semiconductor devices each having a shift register.

II. Description of the Prior Art

The thermal printing system has been widely used as a system for obtaining a hard copy which is easily incorporated in a variety of equipment such as various types of printers and facsimile systems.

In the variety of applications described above, one of the important issues is to improve the printing speed of a thermal printing head used in a facsimile system or line printer.

In order to increase the head printing speed, (a) the pulse width of the applied voltage to each heater must be shortened; or (b) the number of heaters which are simultaneously operated must be increased. In method (a), it is difficult to apply a short power pulse having a pulse width of less then 1 mS from the point of view of the service life of the heaters (the heaters are required not to break down under an application of power pulses of, generally, $10^7$ to $10^8$ cycles) irrespective of the material and process of manufacture of the heater. In other words, in order to increase the printing speed of the line printer head, a number of heaters must be simultaneously effectively heated.

In a conventional diode matrix head integrally comprising a diode array and a heater array, generally, 16, 32 or 64 heaters are simultaneously heated.

In the head of the type described above, attempts have been made to simultaneously heat a number of heaters corresponding to an integer multiple of 16, 32 or 64 by rearranging the head terminal configuration. However, external driver circuits for driving the heaters are required in the same number as the heaters in order to use a diode matrix head, and lead wires for connecting the external driver circuits and the heaters are also required in the number of 16, 32 or (32×an integer); these factors preclude a compact printing unit.

A head is proposed in *Electronics,* Feb. 14, 1980, Page 191 in which a plurality of heaters are integrally arranged with a plurality of semiconductor devices each having a shift register for transferring an image signal corresponding to a pixel for driving a heater. In the head of this type, a semiconductor device has a circuit, which is slightly modified from the external driver circuit used in the conventional diode matrix head, integrally arranged with the heaters. Therefore, the head described in the above reference is neither new nor revolutionary, although it has advantages in that the head driver circuit has a simple construction and the number of lead wires for connecting the head and the external driver circuit is decreased, as compared with the conventional diode matrix head. It is noted that the above system described in Electronics features a shift register for transferring image signals and a plurality of transistors which are connected to the heaters.

The most important issues in forming the head of the type described above relate to the electrical connections between a number of heaters formed in an array and a plurality of semiconductor devices each having a shift register, and to the formation of the head terminals. The above issues greatly influence the outer appearance and shape of the head and the design of an apparatus using the head, and hence the manufacturing cost and reliability of the head.

SUMMARY OF THE INVENTION

It is, therefore, an object of the present invention to provide a compact and low-cost thermal printing head which integrally comprises a heater array and semiconductor devices each having a shift register.

It is another object of the present invention to provide a thermal printing head which can be commonly applied to semiconductor devices of different configurations, which allows easy electrical connections between highly integrated elements in an industrial scale, and which allows easy formation of head terminals.

In order to achieve the above objects of the present invention, there is provided a thermal printing head wherein a set of straight lead wires supported by an electrically insulating flexible film and a set of L-shaped or inverted L-shaped lead wires are formed by a TAB (tape automated bonding) method, one end of each of the set of straight lead wires being connected to one end of one of heaters arranged in an array, the other end of each of the set of straight lead wires being connected to one end of one of semiconductor devices, one end of each of the set of L-shaped or inverted L-shaped lead wires being connected to the other end of one of the semiconductor devices, and the other end of each of the set of L-shaped or inverted L-shaped lead wires being connected to one of a set of multi-layer conductors, part of each of which is formed in a multi-layer.

The thermal printing head of the type having the above construction can accomplish the following:

(1) Lead wire formation cost is decreased by using the TAB method.

(2) A head terminal formation can be obtained which may be applied under various head operating conditions.

(3) A compact head structure can be obtained.

Other objects, features and advantages of the present invention will be apparent from the following detailed description taken in conjunction with the accompanying drawings.

DETAILED DESCRIPTION OF THE PREFERRED EMBODIMENTS

Figure 1A:
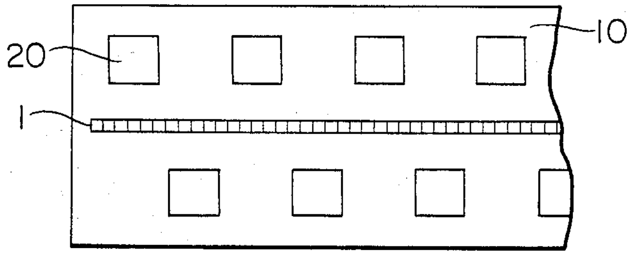
FIGS. 1A to 1C are views respectively showing alternative arrangements of a thermal printing head each comprising a heater array and a plurality of semiconductor devices each having a shift register.
Figure 1B:
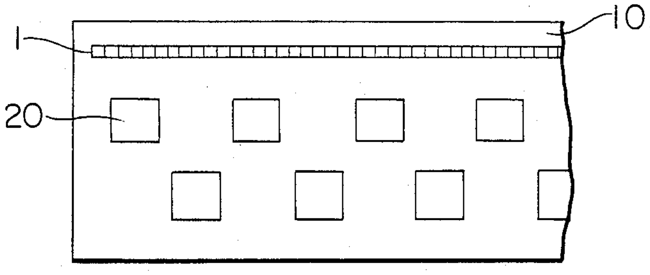
Figure 1C:
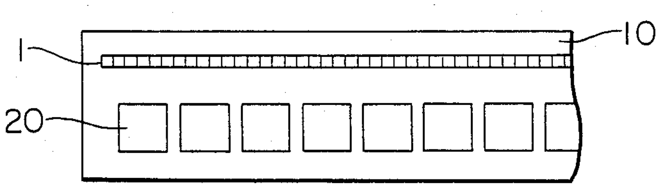

FIGS. 1A to 1C respectively show alternative arrangements of semiconductor devices 20 with respect to a number of heaters 1 formed in an array on a substrate 10. Electrodes of the heaters 1 formed in an array extend in the upper and lower directions (not illustrated in FIGS. 1A to 1C). When the semiconductors are to be respectively electrically connected to these electrodes, there are three arrangements of semiconductor devices 20, as shown in FIGS. 1A to 1C.

As may be apparent from FIGS. 1A to 1C, in the arrangement shown in FIG. 1C, the area of the outer face of the head is decreased. Since a small heater substrate is used, the substrate formation cost is decreased. The arrangements shown in FIGS. 1A and 1B are regarded as arrangements for cases where the arrangement shown in FIG. 1C may not be obtained because of the electrical connections, or where a head having highly integrated heaters is necessitated to manufacture. In any case, the electrical connections between the heaters and the semiconductors devices are preferably highly integrated to as great a degree as possible.

Figure 2:
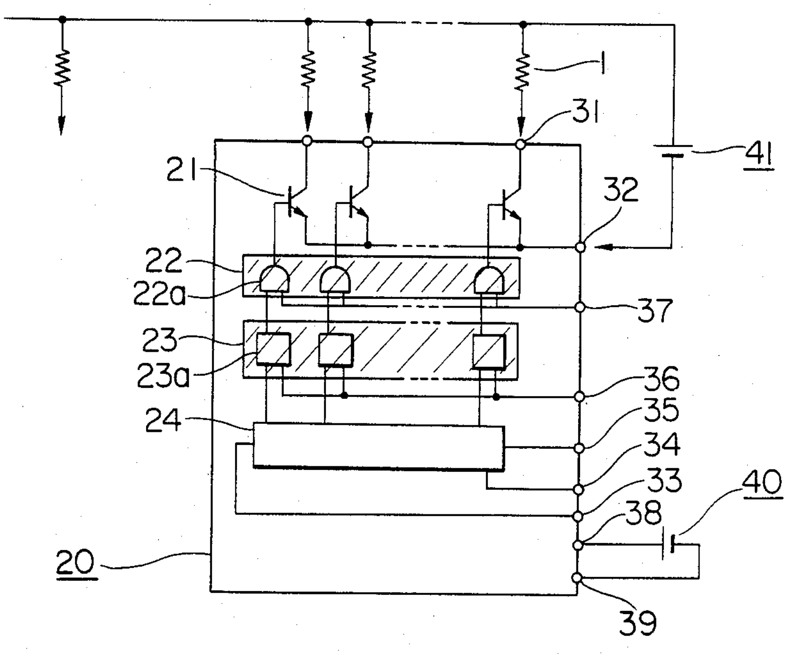
FIG. 2 is a view showing an example of a semiconductor device having a shift register which is used in the present invention.

FIG. 2 shows an example of a semiconductor device having a shift register according to the present invention. Referring to FIG. 2, a semiconductor device 20 comprises a plurality of npn transistors 21, a gate circuit 22 having gates 22*a* which switch the corresponding npn transistors 21 in accordance with an image signal, a buffer circuit 23 having buffers 23*a* which number the same as the npn transistors 21 and temporarily store the image signal therein, and a shift register 24 which has memory cells numbering the same as the npn transistors 21 and which processes the image signal by serial parallel conversion. Reference numeral 40 denotes a power source for driving the semiconductor device 20; and 41, a power source for heating heaters 1.

The operating function of the semiconductor device 20 can be described by describing the operating functions of the following terminals. Reference numeral 31 denotes collector terminals of a plurality of npn transistors 21 each connected to one of the heaters 1; 32, a common emitter terminal of the npn transistors 21 commonly connected in the semiconductor device 20; 33, an image signal input terminal (to be referred to as a PIX-IN terminal hereinafter) of the shift register 24; 34, an image signal transfer clock input terminal (to be referred to as a CK terminal hereinafter); 35, an image signal output terminal (to be referred to as a PIX-OUT terminal hereinafter) of the shift register 24; 36, a terminal (to be referred to as an STB terminal) for an STB signal which allows the image signal transferred in the shift register 24 to be latched or temporarily stored in the buffers 23*a*; 37, a terminal (to be referred to as an ENB terminal hereinafter) for an ENB signal which is supplied to the gates 22*a* to switch the npn transistors 21 in accordance with the image signal latched in the buffer circuit 23; 38, a positive terminal of the power source 40; and 39, a negative terminal of the power source 40. The transistor 21 may alternatively comprise pnp transistors; in this case, the polarity of the power source must be reversed.

The negative terminal 39 of the power source 40 and the negative terminal 32 (or common emitter terminal 32) of the power source 41 can be commonly connected within the semiconductor device 20 or outside thereof. Such an electrical connection must be made at a location which is least influenced by external noise.

Referring to FIG. 2, when the image signal is supplied to the PIX-IN terminal 33 and is transferred to the shift register 24 in response to a CK signal at the CK signal 34, the transferred image signal is latched in the buffer circuit 23 in response to an STB signal at the STB terminal 36. In response to the latched image signal and an ENB signal at the ENB terminal 37, some of those transistors 21 are ON. The heaters 1 connected to those transistors 21 which are ON are heated. At the same time, during the heating operation, the next image signal is supplied from the PIX-IN terminal 33 to the shift register 24. The corresponding heaters are then continuously heated. The above switching operation is a known technique.

For illustrative convenience, FIG. 2 shows one semiconductor device and the electrical connections between the transistors and the heaters, the number of which is the same as that of the transistors. At best 100 transistors may be mounted in the semiconductor device in consideration of the manufacturing technique and cost of the semiconductor device. In practice, the thermal printing head has a number of semiconductor devices 20 as shown in FIG. 1.

Figure 3:
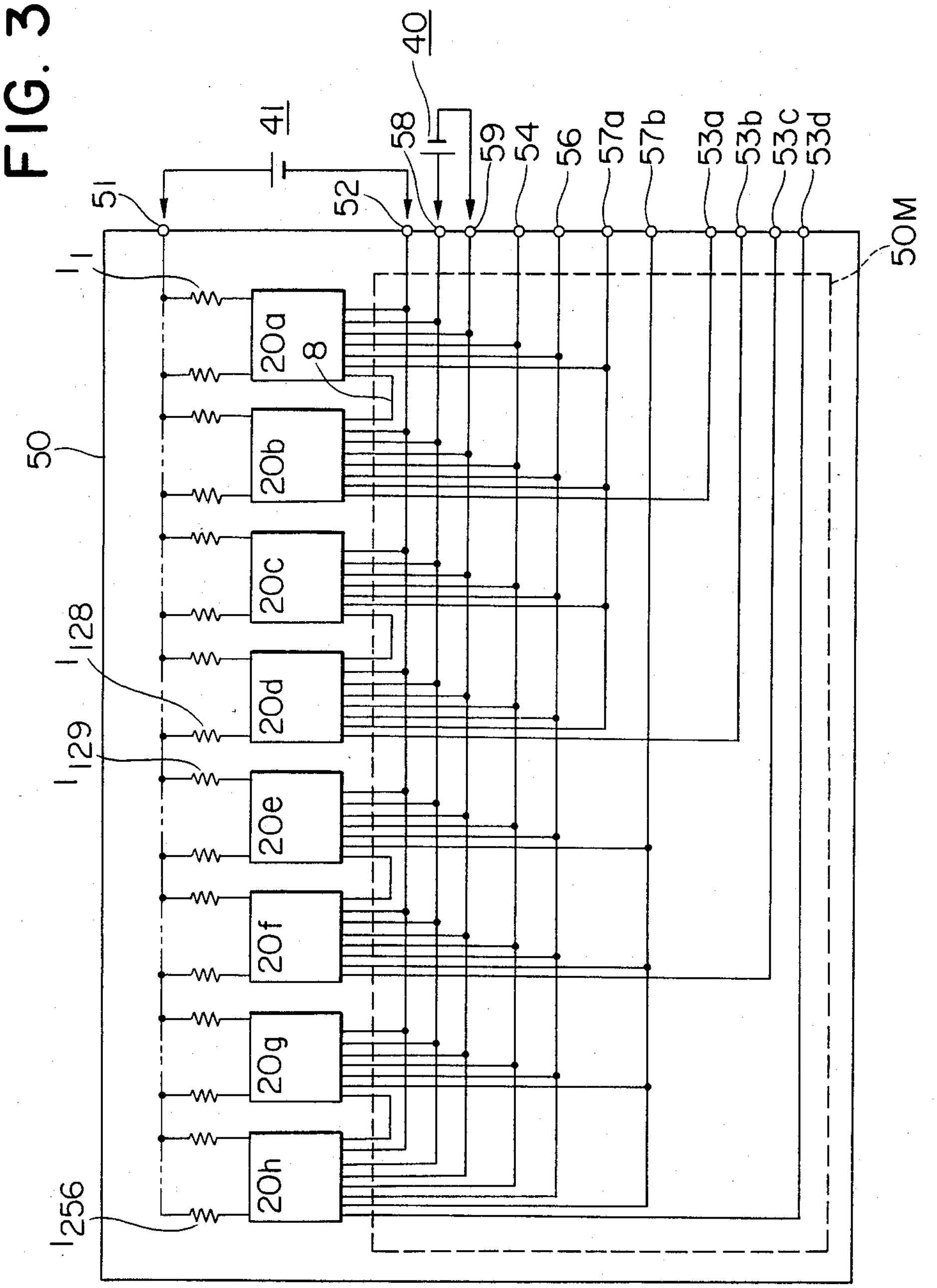
FIG. 3 is a block diagram showing electrical connections between the heaters and the semiconductor devices of the thermal printing head according to the present invention.

FIG. 3 shows an example of electrical connections of the head in which eight semiconductor devices are used, the heaters are divided into two subdivisions for image signal printing, and an image signal is supplied to four input terminals of the semiconductor devices. Four PIX-IN terminals 53*a* to 53*d* are formed to increase the transfer speed of the image signal in the head.

Referring to FIG. 3, reference numeral 50 denotes a head as a whole. If 32 heaters are connected to each of eight semiconductor devices 20*a* to 20*h*, a total of 256 heaters $\mathbf{1}_1$ to $\mathbf{1}_{256}$ are connected to the semiconductor devices 20*a* to 20*h*. However, this number of heaters is very small, and is, for example, about 1/10 that in an 8-dot/mm head for a facsimile printer for a paper size of B4 wherein 2048 heaters are used.

The terminals of the head 50 shown in FIG. 3 correspond to those of the head shown in FIG. 2. A positive terminal 51 of a power source for heating the heaters does not correspond to any part named in FIG. 2. A negative terminal 52 of the power source for heating the heaters corresponds to the negative terminal 32 of the power source 41. The PIX-IN terminals 53*a* to 53*d* correspond to the PIX-IN terminal 33. A CK terminal 54 corresponds to the CK terminal 34. An STB terminal 56 at which an STB signal appears to temporarily store the image signal corresponds to the STB terminal 36. ENB terminals 57*a* and 57*b* at which an ENB signal appears to switch the transistors together with the image signal correspond to the ENB terminal 37. A positive terminal 58 of a power source for driving the semiconductor devices corresponds to the positive terminal 38. A negative terminal 59 of the power source for driving the semiconductor devices corresponds to the negative terminal 39. The PIX-IN and PIX-OUT terminals between the semiconductor devices 20*a* and 20*b*, 20*c* and 20*d*, 20*e* and 20*f*, and 20*g* and 20*h* are connected by U-shaped wirings 8, respectively, to transfer the image signal from the semiconductor device 20*b* to the semiconductor device 20*a*, from 20*d* to 20*c*, from 20*f* to 20*e*, and from 20*h* to 20*g*.

The operation of the head 50 shown in FIG. 3 will be described hereinafter. An image signal is simultaneously supplied to the PIX-IN terminals 53*a* and 53*b*. The image signal is then transferred to the semiconductor devices 20*a* to 20*d* in response to the clock pulse at the CK terminal 54. The transferred image signal is latched or temporarily stored in response to the STB signal appearing at the STB terminal 56. The ENB signal appearing at the ENB terminal 57*a* is supplied to heat the heaters $1_1$ to $1_{128}$. During this heating period, the next image signal for heating the heaters $1_{129}$ to $1_{256}$ in response to the ENG signal appearing at the ENB terminal 57*b* in the following heating period is temporarily stored in the buffers of the semiconductor substrates 20*e* to 20*h* in response to the signals respectively appearing at the terminals 53*c*, 53*d*, 54 and 56. As a result, the heaters $1_1$ to $1_{256}$ are divided into two subgroups which are sequentially driven, as described above.

When the operating functions of the semiconductor device shown in FIG. 2 are changed, a method for electrically connecting the semiconductor devices to the heaters, and a method for heating the heaters are modified accordingly.

The operating functions of the semiconductor device can be changed as follows:

(1) The buffer circuit shown in FIG. 2 can be omitted in order to simplify the circuit arrangement of the semiconductor device.

(2) A device selection function (chip select function) may be added to the functions of the semiconductor device in accordance with the operating conditions of the head, instead of forming a plurality of termnals having the same function (terminals 53*a* to 53*d* or terminals 57*a* and 57*b* in FIG. 3). All head terminals then respectively comprise terminals having different functions.

(3) A function may be added to the semiconductor device shown in FIG. 2 so as to set a pulse width of a signal applied to continuously ON heaters to be smaller than a pulse width of a signal applied to continuously OFF heaters.

Several circuits having such modifications or a combination of items (1) to (3) may be proposed. However, since the present invention may be applied to any circuit arrangement, a detailed description of those circuit arrangements will be omitted. Such arrangements are known to those who are skilled in the art. According to the present invention, a thermal printing head is proposed which has a heater array, which is effectively electrically connected to semiconductor devices, each having a shift register.

Important points in adopting such a head construction are clearly illustrated in FIG. 3 and will be described below:

(1) The electrode at one end of each of the heaters is connected with a high packing density to one of the transistors of the semiconductor device.

(2) A multi-layer wiring 50M is formed in consideration of the current capacity of components.

(3) The terminal can be divided into subterminals (terminals 53*a* to 53*d* or terminals 57*a* and 57*b* in FIG. 3) having the same function which is required in the head.

The method of dividing the terminal in item (3) differs in accordance with the operating conditions of the head and the circuit function of the semiconductor device. However, in the present invention, a change in the pattern of the multi-layer wiring and of the film carrier will allow a desired method of division. Therefore, no technical difficulty is imposed on the process of manufacturing the head.

The electrical connection method of the circuit according to the present invention will be described with reference to FIG. 4.

Figure 4:
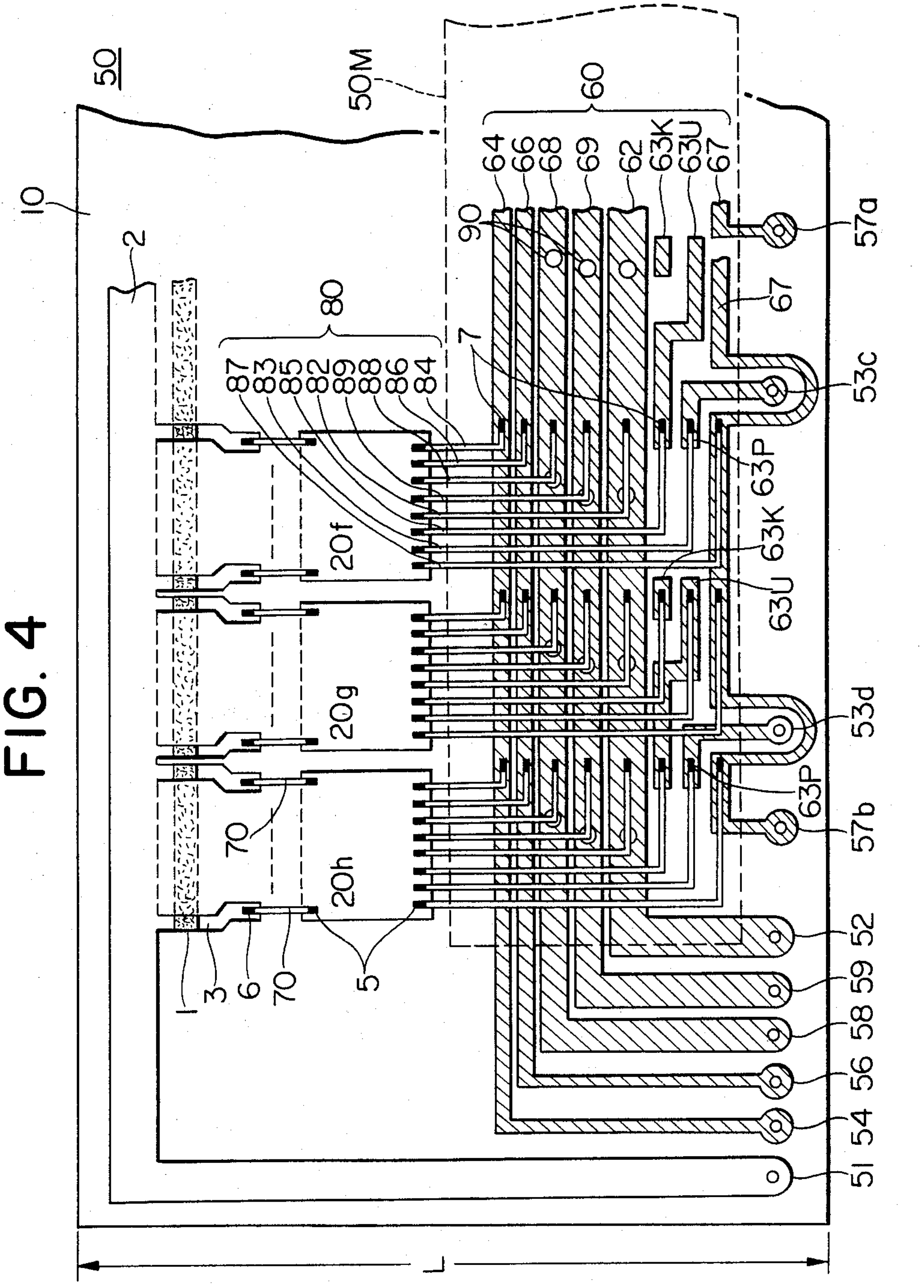
FIG. 4 is a detailed view showing a model of the wiring of the circuit shown in FIG. 3.

FIG. 4 is a plan view showing the electrical connections of the portion corresponding to the semiconductor devices 20*f*, 20*g* and 20*h* shown in FIG. 3.

Referring to FIG. 4, the heaters 1 formed in an array, a common electrode 2 which is connected to one end of each of the heaters 1, and electrodes 3 each of which is connected to the other end of one of the heaters 1 are formed on the substrate 10. On the substrate is further formed a set 60 of upper multi-layer wiring conductors mostly formed parallel to the heater array. At one end of the set 60 of upper multi-layer wiring conductors, terminals (or terminal mount portions) 52, 53*a* to 53*d* (53*a* and 53*b* are not shown), 54, 56, 57*a*, 57*b*, 58 and 59 are formed as the terminals of the head shown in FIG. 3. One end of the set 60 having these terminals substantially corresponds to the other terminal of the set 60 of upper multi-layer wiring conductors; the terminals 52, 53*a* to 53*d*, 54, 56, 57*a*, 57*b*, 58 and 59 respectively correspond to terminals 62, 63*p* (the terminals 63*p* respectively correspond to the terminals 53*a* to 53*d*), 63*u*, 63*k*, 64, 66, 67 (corresponding to the terminals 57*a* and 57*b*), 68 and 69. A set 70 of straight lead wires and a set 80 of L-shaped lead wires (or inverted L-shaped lead wires) are formed by the TAB method at both sides of each of the semiconductor devices 20*a* to 20*h* (semiconductor devices 20*a* to 20*e* are not shown). One end of each of the straight lead wires is connected to one of the transistors at one side of the semiconductor device at a lead wire connecting portion 5, and one end of each of the L-shaped or inverted L-shaped lead wires is connected to the other side of the semiconductor device at another lead wire connecting portion 5. The other end of each of the straight lead wires is connected to one of the electrodes 3 of the heaters 1 at a lead wire connecting portion 6, and the other end of each of the L-shaped or inverted L-shaped lead wires is connected to one of the upper multi-layer wiring conductors at a lead wire connecting portion 7.

In the set 80 of L-shaped or inverted L-shaped lead wires, reference numeral 82 denotes a lead wire for the common emitter terminal of the transistors; 83, a lead wire for the PIX-IN terminal; 84, a lead wire for the CK terminal; 85, a lead wire for the PIX-OUT terminal; 86, a lead wire for the STB terminal; 87, a lead wire for the ENB terminal; 88, a lead wire for the positive terminal of the power source for driving the semiconductor devices; and 89, a lead wire for the negative terminal of the power source for driving the semiconductor devices. Each of the semiconductor devices 20*f*, 20*g* and 20*h* is connected to the above terminals through the lead wires 82 to 89. When the positive terminal 51 of the power source for driving the heaters is connected to the common electrode 2, an electrical connection shown in FIG. 3 is performed with a connection as shown in FIG. 4. The functions of components among the set 60 of the upper multi-layer wiring conductors shown in FIG. 4 are readily understood from the configuration of the set 80 of the L-shaped or inverted L-shaped lead wires, except for the multi-layer wiring conductors 63*p* for forming the image signal terminals for the head, a U-shaped portion of the upper multi-layer wiring conductors which is connected to the PIX-IN and PIX- OUT terminals of adjacent semiconductor devices (e.g., **20*h* and 20*g*), and dummy conductors 63*k* for mechanically fixing the PIX-OUT lead wire 85** of each semiconductor device which is not connected to a PIX-IN terminal of the next semiconductor device.

With reference to the above description together with FIG. 4, the configuration of the thermal printing head according to the present invention may be summarized as follows:

(1) One end of each of the straight lead wires formed by the TAB method is connected to one of the transistors at one side of each of the semiconductor devices **20*f* to 20*h*** each having a shift register. One end of each of the L-shaped or inverted L-shaped lead wires is connected to the other side of each semiconductor devices.

(2) The other end of each of the straight lead wires is connected to each of the electrodes 3 of the heaters 1. The other end of each of the L-shaped or inverted L-shaped lead wires is connected to each of the upper multi-layer wiring conductors formed parallel to the heater array. Thus, the multi-layer wiring 50M is formed. The terminals for the head extend from the set 60 of upper multi-layer wiring conductors and the common electrode 2 of the heaters. The terminals for the head are indicated by reference numerals 51, 52, **53*a* to 53*d*, 54, 56, 57*a*, 57*b*, 58 and 59**.

(3) In order to divide a terminal having a specific function for the head so as to form subterminals, the upper multi-layer wiring conductors connected thereto are separated from the heaters when the conductors are formed parallel to the heater array. In this case, as may be apparent from FIG. 4, the two types of terminals (divided as per the terminals **53*a* to 53*d* and 57*a* and 57*b***, respectively) which are located farthest from the heater array can be independently divided into an arbitrary number.

As far as the PIX-IN and PIX-OUT terminals are concerned, one type of terminal can be considered to be divided by bringing one of the lead wires of the semiconductor device into an adjacent relationship with another lead wire (e.g., lead wires 83 and 85). It is possible to divide more than three types of terminals by means of pattern design. However, in practice, the pattern density of the multi-layer wiring conductors becomes higher than that of the heaters in this case, thus resulting in an impractical arrangement.

The terminals 51, 52, 54, 56, 58 and 59, that is, excluding the two types of multi-layer wiring conductors which are located farthest from the heater array, may each be divided into two subterminals by forming terminal mount portions (not shown) in the right-hand side in FIG. 4. By utilizing the above techniques, even if the functions of the various semiconductor devices are changed, technical difficulty in manufacturing the head may not arise. According to the present invention, the terminals for the head can be freely divided.

(4) In the upper multi-layer wiring conductors, especially the upper conductors 62, 68, 69 and so on among the conductors of the head, at which the current is most concentrated, a plurality of through holes 90 are formed so as not to interfere with the connecting portions 7 of the L-shaped lead wires of the upper conductors 62, 68, 69 and so on, so as to assure a current capacity thereof by connecting them to lower conductors (not shown in FIG. 4). Assume that all 2048 heaters are divided into four divisions and that a current of 50 mA flows in each heater. Then, the current capacity of the upper conductor 62 is a current of 25.6 A.

Figure 5:
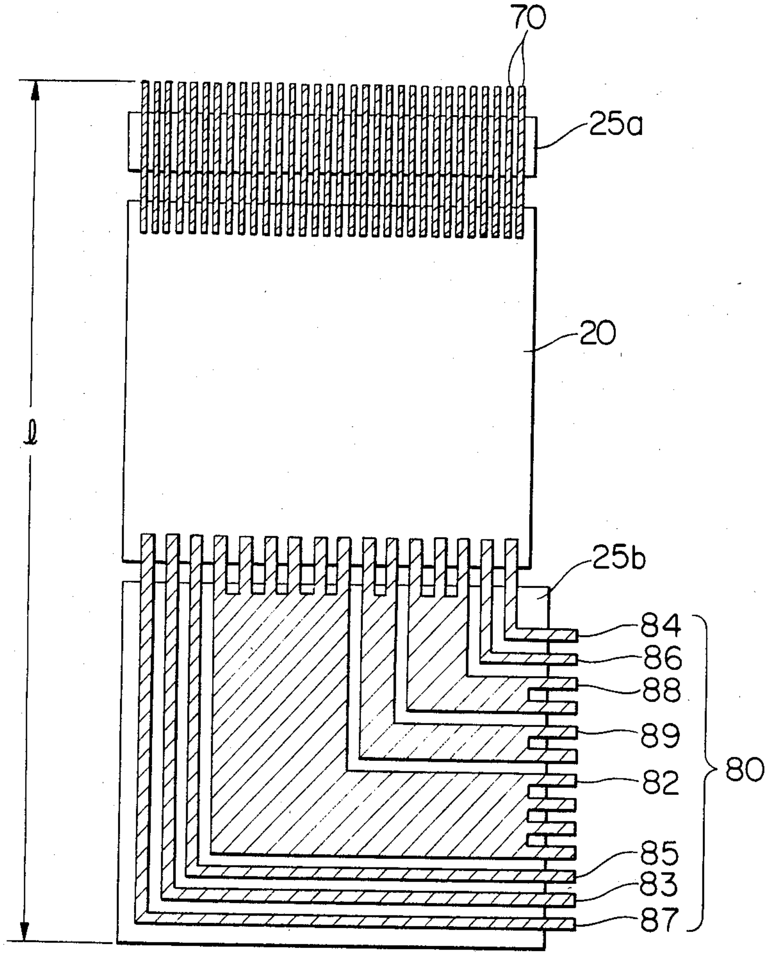
FIG. 5 is a view showing an example of a conductor pattern of a lead formation film carrier of the semiconductor device according to the present invention.

According to the present invention, in order to assure the current capacity described above, the number of lower layers connected to the upper multi-layer wiring conductors is not limited. Using the above method, a film carrier for forming the lead wires of the semiconductor device 20 may be small, resulting in low cost. An example for designing a film carrier is shown in FIG. 5. The set 70 of straight lead wires and the set 80 of L-shaped lead wires are respectively supported by electrically insulating flexible films **25*a* and 25*b*. One end of each of the lead wires is bonded to the semiconductor device 20. The lead wire bonding method is known as the TAB method to those who are skilled in the art. Adoption of the lower conductors described above allows the widths of the upper conductors 62, 68 and 69 connected to the L-shaped lead wires, an overall length l of the film carrier which is indicated in FIG. 5, and hence a head length L shown in FIG. 4**, all to be decreased. Therefore, the manufacturing cost of the head is decreased, and a compact head can be obtained.

The number of sets 60 of the multi-layer wiring conductors including the lower conductors may be determined by a ratio of the manufacturing cost of the set 70 of straight lead wires to that of the set 80 of L-shaped lead wires. The width of each of the sets 80 of L-shaped lead wires can be determined so as not to result in unstable operation of the semiconductor device due to a voltage drop caused by a current flowing through the lead wires. The current capacities of the components described above are determined such that the operating conditions of the semiconductor devices **20*f*, 20*g* and 20*h*** are stabilized even if a voltage drop should occur due to the current flowing through the components.

The distal ends of the L-shaped lead wires shown in FIG. 5 may have the same shape. In this case, the bonding conditions of the lead wires become uniform, thus providing a stable bonding process and excellent reliability of the bonded portions.

The flexible films **25*a* and 25*b* which may comprise polyimide or the like are not shown in FIG. 4**. However, they prevent the occurrence of short-circuiting except for the lead wire connecting portions.

Thermal printing heads according to the preferred embodiments are described hereinafter.

Figure 6:
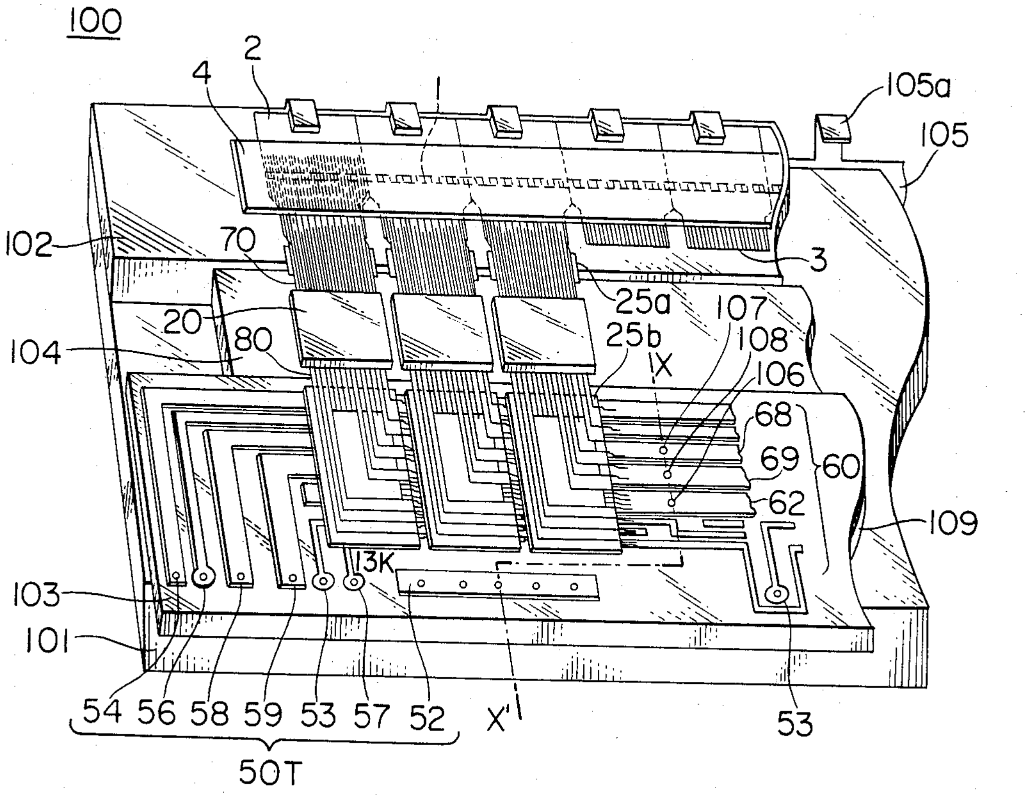
FIG. 6 is a partial perspective view of a thermal printing head according to an embodiment of the present invention.

FIG. 6 shows a thermal printing head 100 according to a first embodiment of the present invention. Referring to FIG. 6, reference numeral 101 denotes a head support. A heater substrate 102, a multi-layer wiring substrate 103, and a spacer 104 are mechanically supported on the head support 101. The heaters 1 which form an array, the common electrode 2, the electrodes 3 which respectively correspond to the heaters 1, and a heater protective film 4 are formed on the heater substrate 102. Since a surge current flows through the common electrode 2, a projection **105*a* of a metal foil lead 105 is formed at the common electrode of the heaters of each corresponding semiconductor device 20**.

When the metal foil lead 105 is connected to the common electrode 2, a voltage drop due to the resistance of the common electrode 2 can be decreased.

A double-sided printed-circuit board is used for the substrate 103. The set 60 of upper multi-layer wiring conductors is formed on the upper surface of the substrate 103. The pattern of the set 60 of upper multi-layer wiring conductors can be designed in the same manner as in FIG. 4. The terminal mount portion 50T (including the terminals 52, 53, 54, 56, 57, 58 and 59) for the head is formed. The functions of these terminals are the same as in FIG. 4, and a detailed description thereof will be omitted, other than that the PIX-IN terminal 53 is divided to be connected to each one of four semiconductor devices and that one terminal of the power source for driving the heaters is replaced with the metal foil lead 105.

The other end of each of the straight lead wires supported by the flexible film 25*a* and bonded to the semiconductor devices is connected to each of the electrodes 3 of the heaters, in the same manner as in FIG. 4. Similarly, the other end of each of the L-shaped lead wires supported by the flexible film 25*b* and bonded to the semiconductor devices is connected to each of the upper multi-layer wiring conductors. Since a surge current flows through the upper conductors 62, 68 and 69 among the set 60 of upper multi-layer wiring conductors, the upper conductors 62, 68 and 69 are connected to the lower conductors formed on the rear surface of the substrate 103 through through holes 106 to 108.

Figure 7:
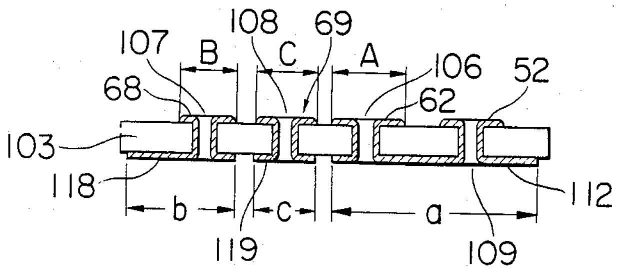
FIG. 7 is a sectional view of the thermal printing head taken along the line X—X' in FIG. 6.

FIG. 7 shows the connections between the upper conductors 62, 68 and 69, and the lower conductors at the section taken along the line X—X′ of the multi-layer wiring conductors. Referring to FIG. 7, the upper conductors 62, 68 and 69 are respectively independently connected to lower conductors 112, 118 and 119 through the through holes 106, 107 and 108. In this case, widths a, b and c of the lower conductors 112, 118 and 119 formed parallel to the upper conductors 62, 68, and 69 are wider than widths A, B and C of the upper conductors 62, 68 and 69, respectively. Therefore, large current capacities are guaranteed. Here, it is noted that the through hole 109 is formed to connect the terminal 52 to the lower conductor 112. The lower conductors 112, 118 and 119 are electrically insulated from the head support 101 through an insulating layer 109 (FIG. 6).

Lead wires or a connector are connected to the terminal mount portion 50T for the head to complete the manufacture of the thermal printing head of the first embodiment of the present invention.

The lead wires or connector are not shown in FIG. 6. However, when the pin positions of the connector match the configuration of the terminal mount portion 50T, the connector can be readily attached thereto.

Figure 8:
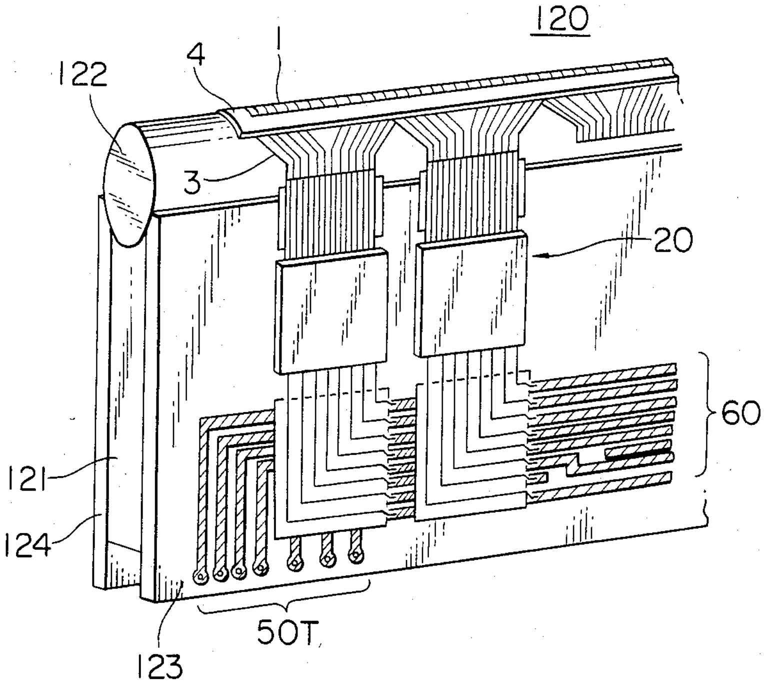
FIG. 8 is a partial perspective view of a thermal printing head according to another embodiment of the present invention.

FIG. 8 shows a thermal printing head 120 according to a second embodiment of the present invention. The heaters 1, the common electrode 2 (not shown in FIG. 8), the electrodes 3, and the heater protective layer 4 are formed on the outer surface of a cylindrical or columnar base 122. The base 122 is supported on a head support 121 together with a multi-layer wiring substrate 123 and a common electrode substrate 124. The set 60 of upper multi-layer wiring conductors and the terminal mount portion 50T are formed on the substrate 123, in the same manner as in FIG. 6.

The electrical connections of the semiconductor devices 20 are performed in the same manner as in FIG. 6. Although not clearly shown in FIG. 8, a single conductor having a large current capacity as a common electrode need only be formed on the substrate 124.

In this manner, using the semiconductor devices and the film carrier which similarly to those are used in the first embodiment, the thermal printing head is obtained in the second embodiment to have a shape which is greatly different from the shape of the thermal printing head of the first embodiment.

As described above, the present invention provides a very compact thermal printing head which has the heater array and semiconductor devices each having a shift register, and which may be manufactured by mass production and at low cost.

In the first and second embodiments, the heaters are formed independently of the multi-layer wiring conductors in order to effectively embody the present invention. Thus, the manufacturing cost of the heater substrate is decreased.

Furthermore, according to the present invention, the semiconductor devices are arranged in a manner shown in FIG. 1A, and the heater density is increased to 16 or more heaters/mm, and hence a highly integrated head can be manufactured. For this purpose, in the second embodiment, semiconductor devices are also mounted on the substrate 124.

Furthermore, according to the present invention, the set 70 of straight lead wires and the set 80 of L-shaped lead wires which are both connected to the semiconductor devices shown in FIG. 5 function to effectively dissipate heat arising from power consumed in the semiconductor devices; therefore, the set 80 of L-shaped lead wires in particular must have as great a width as possible. In this manner, the present invention has an advantage in that heat in the semiconductor is effectively dissipated.

In summary, the present invention provides a high-performance thermal printing head which may be manufactured at low cost.

What is claimed is:

1. A thermal printing head comprising:

(a) a base having opposite sides;

(b) a heating element substrate arranged on one side of said base;

(c) a multilayer wiring substrate arranged on the other side of said base;

(d) a multiple of heaters formed in an array on said heating element substrate, one end of each which is connected to a common electrode;

(e) a plurality of semiconductor devices for driving said multiple of heaters, each of said plurality of semiconductor devices comprising at least a plurality of transistors respectively connected to said multiple of heaters and a shift register having memory cells respectively corresponding to said transistors to process an image signal by serial-parallel conversion so as to allow the image signal to selectively switch said transistors;

(f) a set of multi-layer wiring conductors arranged on said multi-layer wiring substrate and having a terminal mount portion and a multi-layer structure at at least a part thereof, said multi-layer wiring conductors being formed on opposite surfaces of the multi-layer wiring substrate;

(g) a set of straight lead wires supported on an electrically insulating flexible film, one end of each of said straight lead wires being connected to the other end of one of said heaters, and the other end of each of said straight lead wires being connected to one terminal of one of said semiconductor devices; and (h) a set of L-shaped lead wires supported on another electrically insulating flexible film, one end of each of said L-shaped lead wires being connected to the other end of one of said semiconductor devices, and the other end of each of said L-shaped lead wires being connected to one of said multi-layer wiring conductors.

2. A thermal printing head according to claim 1, wherein said heaters are formed on an outer surface of a cylindrical or columnar base.

3. A thermal printing head according to claim 1, wherein a terminal mount portion for said terminals having the same function among said terminals for said head is formed into split terminal mount portions, said split terminal mount portions being connected to corresponding ones of said multi-layer wiring conductors which are located farthest from said array of said heaters.

4. A thermal printing head according to claim 1, wherein said set of multi-layer wiring conductors is substantially parallel to said array of heaters.

5. A thermal printing head according to claim 1, further comprising a first power source for driving said heaters, a second power source for driving said semiconductor devices, and through whole connecting portions in said set of multi-layer wiring conductors on opposite surfaces of said multi-layer wiring substrate for turning on said first and second power sources.

6. A thermal printing head according to claim 1, in which at least some of said multi-layer wiring conductors formed on one surface of the multi-layer wiring substrate are wider than corresponding multi-layer wiring conductors formed on the opposite surface of the multi-layer wiring substrate in parallel therewith for permitting large current capacities.

* * * * *